(12) United States Patent
Lee et al.

(10) Patent No.: US 6,824,049 B2
(45) Date of Patent: Nov. 30, 2004

(54) CARD TRANSACTION SETTLEMENT METHOD IN POINT OF SALE SYSTEMS

(75) Inventors: Jong In Lee, Seoul (KR); Kang Hyoung Kim, Seoul (KR)

(73) Assignee: Smartro Co., Ltd., Seoul (KR)

( * ) Notice: Subject to any disclaimer, the term of this patent is extended or adjusted under 35 U.S.C. 154(b) by 392 days.

(21) Appl. No.: 09/917,324

(22) Filed: Jul. 27, 2001

(65) Prior Publication Data

US 2001/0050314 A1 Dec. 13, 2001

Related U.S. Application Data

(63) Continuation-in-part of application No. 09/121,526, filed on Jul. 23, 1998, now abandoned.

(51) Int. Cl.[7] .............................. G06K 5/00; G06F 17/60
(52) U.S. Cl. ......................... 235/380; 235/379; 705/16; 705/17; 705/44
(58) Field of Search ................................. 235/375, 379, 235/380–382.5; 705/16, 18, 35, 39, 44

(56) References Cited

U.S. PATENT DOCUMENTS 5,845,256 A * 12/1998 Pescitelli et al. ............. 705/4
5,991,750 A * 11/1999 Watson ......................... 705/44
5,996,076 A * 11/1999 Rowney et al. ............. 713/201
6,324,526 B1 * 11/2001 D'Agostino ................. 705/44
6,343,279 B1 *  1/2002 Bissonette et al. ............ 705/41

* cited by examiner

Primary Examiner—Michael G. Lee
Assistant Examiner—Jamara A. Franklin
(74) Attorney, Agent, or Firm—Wiggin and Dana LLP; Dale L. Carlson; Michael K. Kinney

(57) ABSTRACT

A card transaction settlement method in a point of sale (POS) system is described. More particularly, a payment by either the credit or debit card is made after an approval before the card transaction (ABCT) for a virtual transaction amount (VTA) is given, and in which when the transaction is completed, an approval after the card transaction (AACT) for the actual transaction amount (ATA) is requested for the transaction settlement. Settlement can be conveniently accomplished since conflict between the merchant and the consumer, caused by a difference between the transaction amount and the debited can be eliminated. The merchant has less of the financial risk for refund. A signature is not necessary on the signature form, resulting in that true non-cashier self-service sales can be introduced to the sales management system.

10 Claims, 13 Drawing Sheets

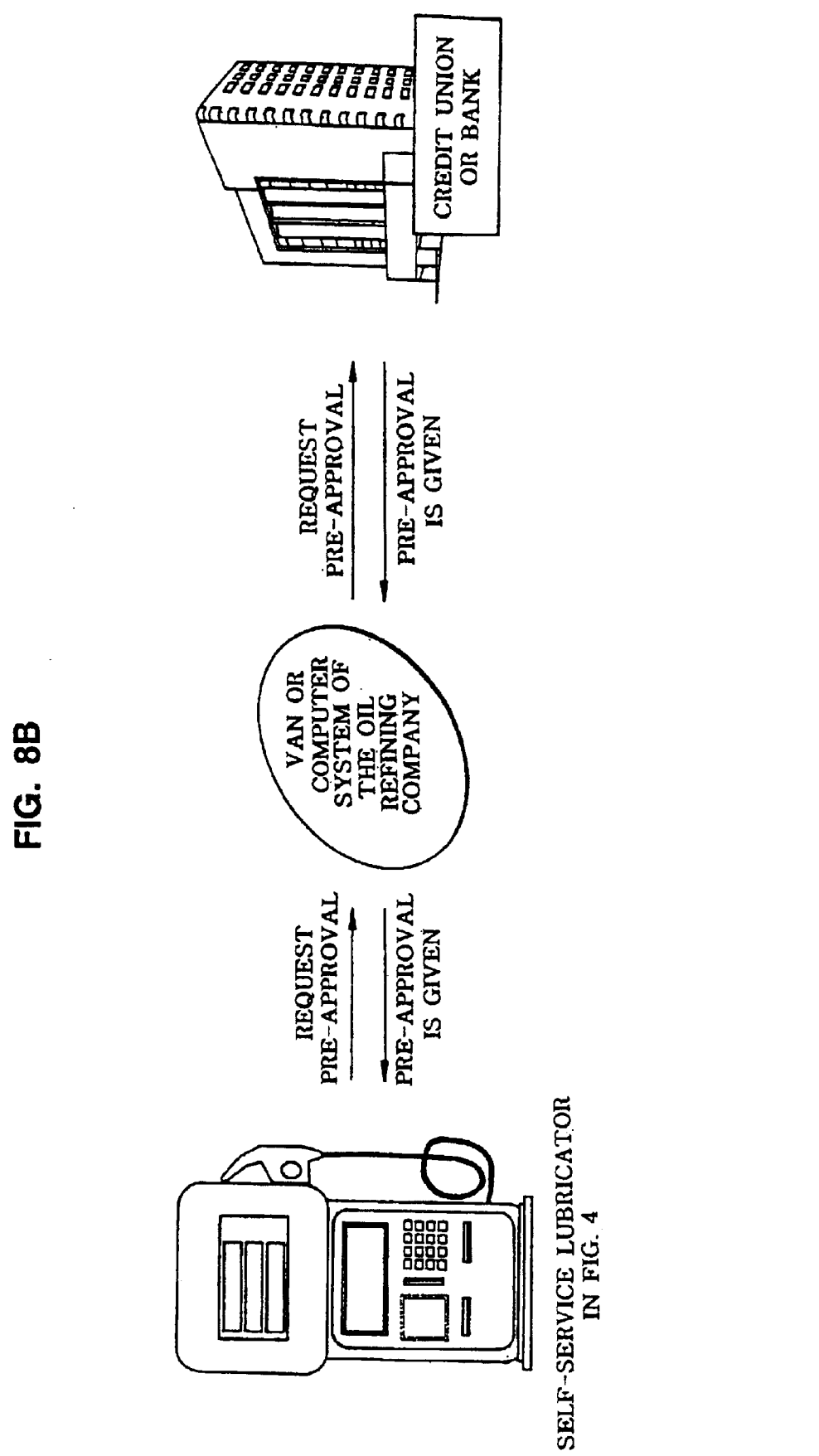

CARD TRANSACTION SETTLEMENT METHOD IN POINT OF SALE SYSTEMS

CROSS-REFERENCE TO RELATED APPLICATION

This patent application is a continuation-in-part of commonly owned, now abandoned, U.S. patent application Ser. No. 09/121,526 entitled "CARD TRANSACTION SETTLEMENT METHOD IN POINT OF SALE SYSTEMS" that was filed on Jul. 23, 1998. Patent application Ser. No. 09/121,526 is incorporated by reference in its entirety herein.

BACKGROUND OF THE INVENTION

1. Field of the Invention

The present invention relates to a card transaction settlement method in a point of sale system, afterward referred as POS system, which is capable of using a credit card or a debit card, and more particularly, to the card transaction settlement method in which an actual transaction is made after authorizing an approval before a card transaction ABCT for a virtual transaction amount VTA is given, and in which when the actual transaction is completed, an approval after a card transaction AACT for an actual transaction amount ATA is requested for the transaction settlement whereby the settlement with the card can be conveniently accomplished since any conflict between the merchant and the consumer, caused by the difference between the transaction amount and the debited amount against the card and so on, can be eliminated, and whereby the merchant has less of the financial risk for refund, and whereby the signature is not necessary in the signature form, resulting that true non-cashier self-service sales can be introduced to the sales management system. Herein, the VTA may also be a maximum-available amount, an user-entered amount, or a system-established available amount which is already stored in the POS system at different values, the maximum allowed amount values.

The present invention is not restricted to any particular kind of machine, although it is described below, by way of example, with reference to a self-service gas pump in a gas station.

2. Description of Related Art

In general, the conventional sales management system is made to settle the transaction payment with either the card or cash, and particularly in expensive sales management system, the merchant installs the self-service POS system integrally including the sales management system for controlling the operation of the sales machines according to the result of the approval condition from the card terminal connected through the communication cable either to card issuing institutions or to the value-added network communication enterprise so as to increase the sales. But in such a system, the operator who is able to manipulate the card terminal and sales management machine should stay in the place with the system. U.S. Pat. No. 5,652,786 on May 16, filed by Rogers, 1996 discloses an automated interactive bill payment system for processing payment transactions using debit card numbers without the requirement of a personal identification number.

As an example, FIG. 1 illustrates a schematic view of a self-service gas supplying method with the credit card/debit card settlement when the self-service sales system is applied to the general type gas pump. Referring to FIG. 1, the card holder requests to set the payment amount for the gas to be supplied by giving the credit card or the debit card, the sales clerk asks the consumer to sign in a signature form and sets the payment amount for the gas purchase into the gas pump with the use of the POS system after an acquirement of the card approval for the transaction amount for the current gas purchase settlement with the use of the card terminal. Therefore, the consumer who moved to the gas pump begins to feeding the car with the gas using a nozzle gun 5.

FIG. 2 is a schematic view of the self-service supplying gas method making settlement with either the credit card or the debit card using the self-service POS system in which the card terminal and the POS system are integrated together. Referring now to FIG. 2, the consumer makes the card to be read through the credit card recognition means or the debit card recognition means 2 (or the cash verifier 3) which are installed on an outdoor terminal placed near the gas pump, and then sets either the desired payment amount or the desired gas amount with a plurality of setting keys 1. Then the outdoor terminal automatically acquires the card approval through the serial communication, and prints the payment approval slip with the use of the receipt printer 4, and then sets the approved payment amount onto the gas pump. Thereafter, the consumer moves to the gas pump to feed the car with the gas using the nozzle gun 5 by himself.

FIG. 3 is a schematic view of the self-service gas supply method making a payment with either the credit card or the debit card with the use of the self-service gas supply system comprising a credit card recognition means, a debit card recognition means, a cash verifier, a receipt issuing means, and setting keys. Referring to FIG. 3, the consumer sets either the desired payment amount or the desired gas amount with the use of the setting keys 1 after making the card to be read by the credit card recognition means or the debit card recognition means 3 arranged on the gas pump. Herein, the self-service gas supply system acquires the approval code for the card either via the POS system installed in the office near the gas pump, or with a serial communication in the self-service gas supply system itself, and then sets either the approved payment amount or the approved gas amount. Therefore, the consumer begins to feed the car with the gas with the use of the nozzle gun 5 by himself. When the consumer completed filling up the gas, the self-service gas supplying system prints the receipt with the receipt printer 4. After the consumer receives the receipt, the self-service gas supply process is completed.

With the system described with the FIGS. 1–3, a consumer, who wants to purchase the gas with card payment, should receive the card approval for the transaction before feeding the car with the gas (since the card approval obtained after gas purchase can cause the quarrel between the consumer and the gas station merchant, it is not appropriate for the self-service gas supply). Moreover the consumer should set the payment amount for the gas so as to get the card approval for the amount, but the consumer does not know exactly how much gas can be supplied to the gas tank of his or her vehicle resulting in that the consumer request the card approval for the transaction for the purchase of the gas corresponding to the approximate amount.

It can actually take place that the gas tank of a vehicle is already full when a gas amount for the purchase is not fully supplied to the gas tank, resulting in that the consumer may ask a refund corresponding to the difference between the card transaction amount and the payment amount of a gas amount actually served.

Furthermore, if the consumer wishes to cancel the gas purchase after the card approval for the transaction is already received, it becomes more difficult to handle.

To solve problems described above, the card approval can be obtained after gas purchase. But that would be a big quarrel between the consumer and gas station merchant when the card approval is rejected because of the card invalidity. In a non-cashier self-service gas station in particular, if the gas is filled up before receiving the card approval, there can be some disadvantages described above.

BRIEF SUMMARY OF THE INVENTION

The present invention provides a card transaction settlement method in a POS system enabling acceptance of credit card payment and debit card payment, and more particularly to provide the card transaction settlement method in which the payment by either the credit card or the debit card is made after an approval before a card transaction (ABCT) is given, and in which when the transaction is completed, an approval after a card transaction (AACT) is requested for the transaction settlement whereby the settlement with the card can be conveniently accomplished since a conflict between the merchant and the consumer, causing from such as the difference between the transaction amount and the debited amount against the card, can be eliminated, whereby the merchant has less of the financial risk for a difference amount refund, and whereby the signature is not necessary in the signature form, resulting in that true non-cashier self-service sales can be introduced to the sales management system.

A first embodiment of the present invention provides a card transaction settlement method in POS systems for settling transaction payments with use of a credit card and/or a debit card. An approval before the card transaction ABCT for setting a virtual transaction amount (VTA) is requested from an authorization center after the card is inserted. A transactional validity is determined. This may be done by validating an account corresponding to the card as well as the card itself at the authorization center. If the card and account are valid the VTA may be approved and an approval signal sent to the self-service facility. Based upon the approval, the transaction may be executed. After execution, an approval-after-the-card-transaction (AACT) is requested of the authorization center for setting an actual transaction amount (ATA). The VTA may be revalidated into the ATA and a confirmation signal may be sent. The self-service facility may be reinitialized for a next transaction and a receipt issued for the actual executed transaction.

The VTA may be a maximum anticipated transactional amount. It could be set for a particular one-time transaction. The anticipated amount may be determined by attributes of the item or service to be provided and is particularly relevant for items or service of a type for which a payment amount can not readily be predetermined. The attributes can comprise a physical amount of the item, availability of the item or service and/or a service time.

Prior to requesting the ABCT, the card may be read in the transaction terminal and the user may be identified via a personal identification number. The VTA may be denied if it has been determined that the card or account are invalid in which case an approval failure signal may be sent to the self-service facility. The ABCT may be cancelled at various stages. The execution may be constrained so that the ATA is constrained from exceeding the VTA.

In an example of use of an embodiment of the invention, a customer's credit card has a credit limit of $1000. He already spent $800 this period, so the available credit is $200. If he goes to a gasoline station, there is an assumption that no car can hold more than $50 of gasoline (the maximum transaction amount). This establishes a candidate VTA. Other factors related to the product, customer consumption patterns, a profile of the particular customer, or the like could be used to establish the candidate VTA. The card is inserted and the card and the related account validated with the authorization center. The VTA is then set to equal the candidate VTA as this is less than the available credit amount. The setting of the VTA temporarily lowers the available credit to $150 which would be relevant if the customer or a co-holder of the account were simultaneously trying to buy $160 of goods on the same credit card account elsewhere. The car, it turns out, only needs $30 of gasoline. After the fill-up is complete, the system deducts $30 (the ATA) from the previously available credit to now be $170.

If, however, the customer had already spent $975, his available credit would be only $25, which is less than the candidate VTA. The VTA would then have been set equal to $25 instead of the candidate VTA. Because the car could take more than $25 in gasoline, the system would automatically stop filling the car once $25 in gasoline has been dispensed (thus the transaction is restrained to prevent the ATA from exceeding the approved VTA).

BRIEF DESCRIPTION OF THE DRAWINGS

The above objects and other advantages of the present invention will become more apparent by describing in detail the preferred embodiment thereof with reference to the attached drawings, in which:

FIGS. 8a–8c illustrate routes for requesting and receiving an approval before a card transaction for a virtual card transaction amount according to the present invention.

DETAILED DESCRIPTION

Hereinafter, a preferred embodiment of the present invention will be described in detail with reference to the accompanying drawings. Furthermore, the present invention will be described with application of the self-service gas pump.

Figure 1:
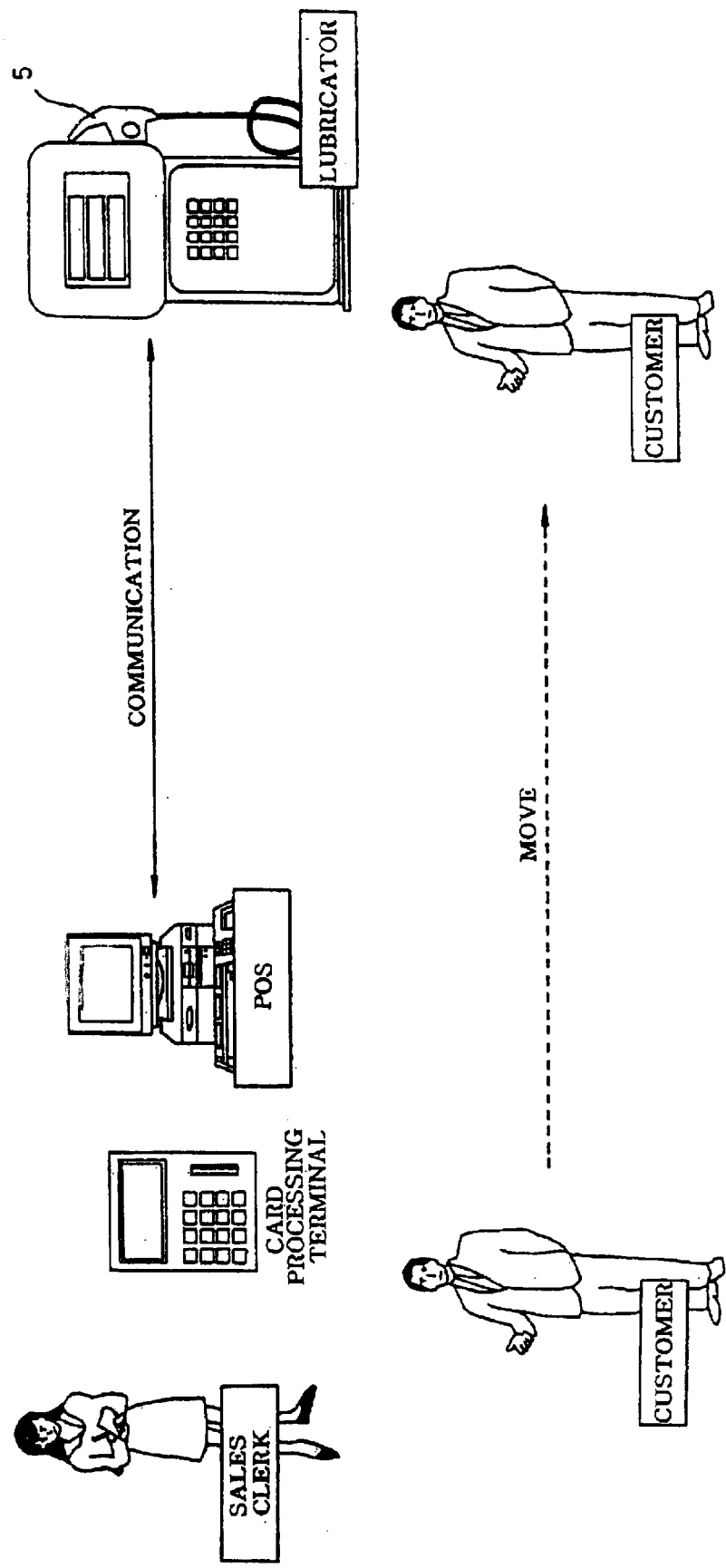
FIGS. 1–3 are schematic views for explaining the self-service gas supply method with either a credit card or a debit card in the prior art.
Figure 2:
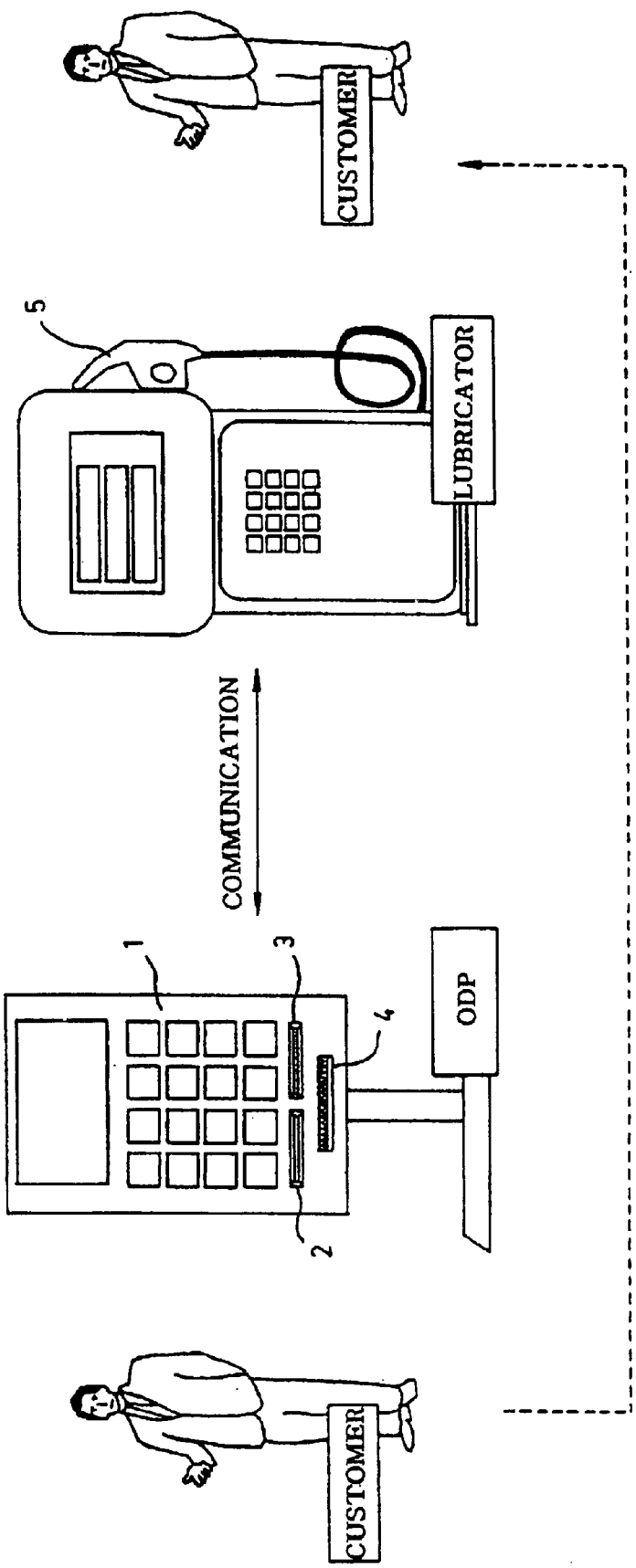
Figure 3:
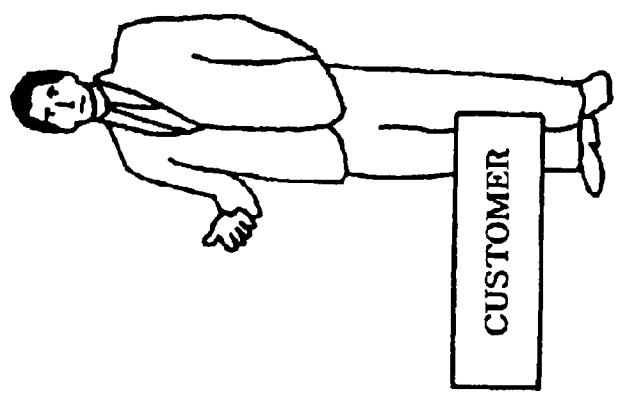
Figure 3:
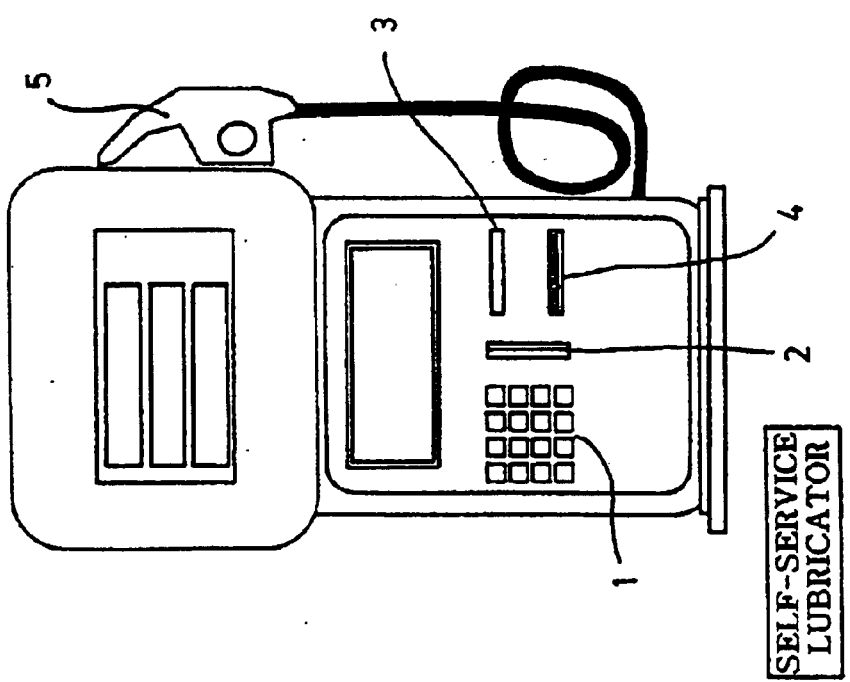
Figure 4:
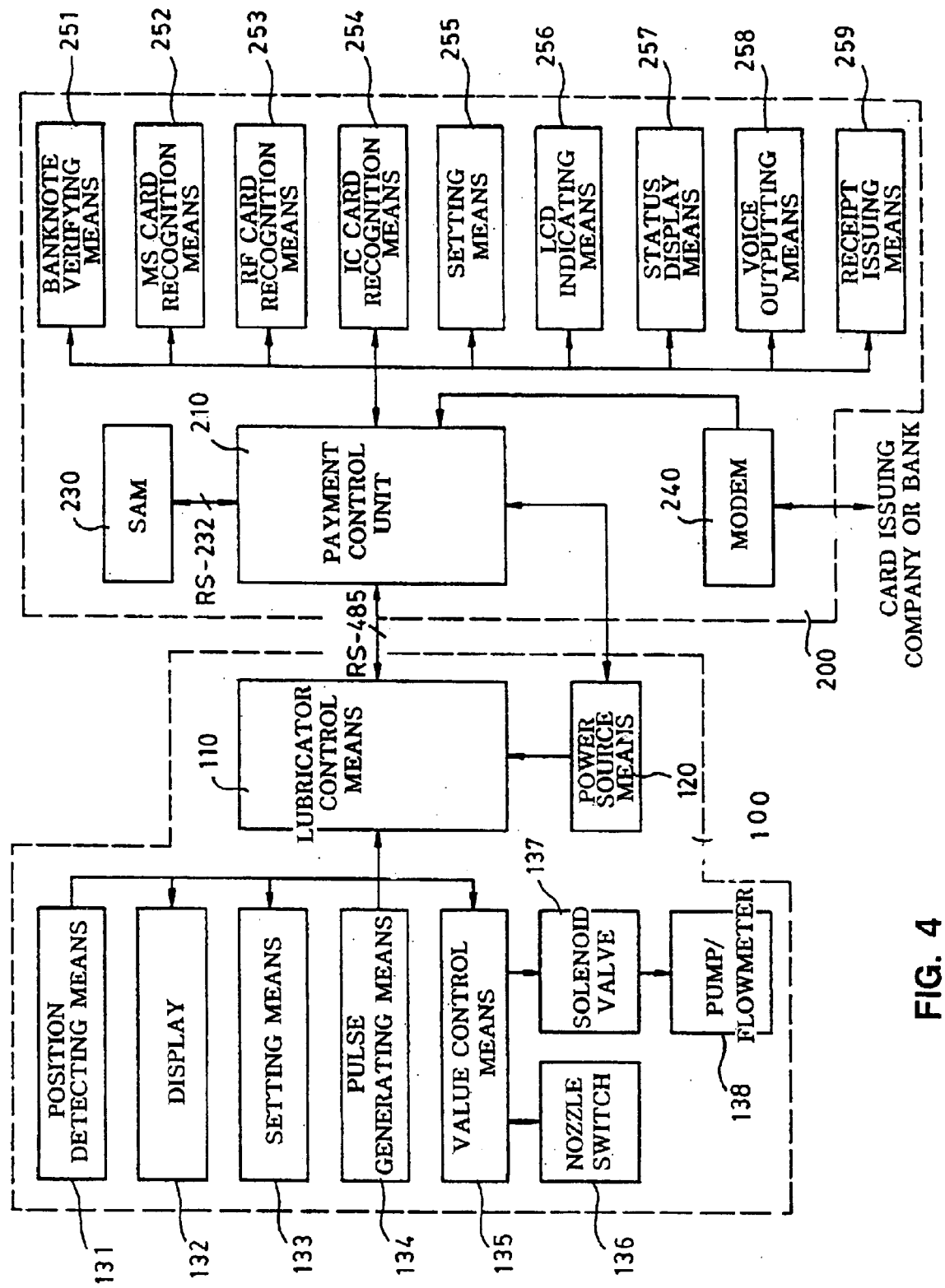
FIG. 4 is a block diagram of the internal configuration of the self-service gas pump for explaining the card transaction settlement method in the POS systems according to an embodiment of the present invention.

FIG. 4 is a block diagram of an internal configuration of the self-service gas pump for explaining the card transaction settlement method in the POS system according to the present invention. Referring to the FIG. 4, the self-service gas pump can be composed of a gas pump 100 and a transaction settlement terminal 200. The gas pump 100 comprises at least one pumping hole, a gas pump control unit 110 connected through a communication cable (RS-485) for receiving the commands from an external control terminal so as to determine whether the gas can be supplied through the pumping hole, for indicating total payment amount and unit price per liter after calculation of how much gas is supplied to the consumer when the command instructing to supply the gas is received, wherein the gas is controlled to be supplied by closing/opening states of nozzle switches and nozzle latches whose number is corresponding to the number of the gas pump holes, and for simultaneously transmitting the calculated payment amount externally via the communication cable (RS-485). The transaction settlement terminal 200 comprises a cash verifier for scanning cash, a card recognition unit for reading an information stored in the various cards, and a transaction settlement control unit 210 connected to the gas pump control unit 110 through the communication cable (RS-485) for the purpose of communicating to each other for giving a permission to supply the gas if the information read from the card is determined to be valid after enquiry of the inputted information, for controlling overall automated payment operation of setting the transaction according to the settlement type and its manner of settling the transaction.

The transaction settlement terminal 200 also comprises a setting means 255 for selecting the settlement type (cash or card) and gas supplying type (fixed amount of gas type, and fixed amount of money type) determined by the consumer. The transaction settlement terminal 200 further comprises a LCD indicator 256 for indicating a service-related information determined by the setting unit in graphics or characters, a status display 257 for displaying status visually with use of light emitting diode LED or lamp, and a voice output 258 for outputting service-related message displayed in the LCD indicating means and in the status display with recorded voice. The cash verifier 251 comprises a banknote slot for inserting banknotes, and cash scanner for determining as to whether the banknote inserted and placed inside of the banknote slot is counterfeit. The card recognition units 252, 253, and 254 comprise a card slot for inserting the card thereinto, a card fluoroscopy window for sensing the radio-frequency card within a certain distance, a radio frequency card recognition unit 253 for reading the card information, a magnetic card recognition unit 252 for reading the information stored in the magnetic stripe of the card, and an IC card recognition unit 254 for reading the card information stored in the IC chip coated in the card, wherein those above mentioned card recognition units read cards either when the card is inserted into the slot or when the card is passing by the card fluoroscopy window. The transaction settlement terminal 200 further comprises a security access module SAM 230 for off-line accessing validity of the information read from the card recognition units upon a receipt of the information transmitted from the gas pump control means through the communication cable, and a communication interface circuit, modem, 240 for supporting data communication between the system and the card issuing institution/value-added network enterprise in order to access on-line the validity of the information read from the card recognition unit. The transaction settlement terminal 200 further comprises a power source unit 220 for providing the power to every unit arranged in the system and a receipt issuing unit 259 for issuing the receipt including payment amounts of transaction under the control of the transaction settlement means.

The SAM 230 is connected to the transaction settlement control unit 210 via the communication cable (RS-232) and can be used to determine the card validity after the card is read either in the radio-frequency card recognition unit 253, or in the IC card recognition unit 254. The transaction settlement control unit 210 is connected to the power source unit 220 and is supplied with the power from the power source unit 220. The transaction settlement control unit 210 is connected to the magnetic card recognition unit 252, the radio-frequency card recognition unit 253, the IC card recognition unit 254, and the cash verifier. The transaction settlement control unit 210 is further connected to the receipt issuing means 259, the LCD indicator 256 for displaying the instruction required to complete the transaction, the status display 257 for indicating the operating status of the system, the voice output 258 for providing the voice message, and the voice output 255 for manipulating the selection of the manipulation keys.

At this time, the card recognition means of course can be installed with all or any of the magnetic card recognition unit, the radio-frequency card recognition unit, and the IC card recognition unit as required, and can be further adjusted according to the desired service to provided.

The gas pump 100 which is controlled by the gas pump control unit supplied with the power from the power source unit 120, is used to supply the gas through the nozzle by pulling the gas stored in the tank under the ground to a pump/flowmeter 138 with the use of opening/closing the nozzle switches 136 and the nozzle latches (not shown in figures), and whose supply amount is determined by a setting unit 133 of the gas pump, and at this time the calculated transaction amount of money corresponding to the supplied gas is displayed in a display 132. Herein, the detection signal is transmitted to the gas pump control means 110 with the use of the pulse generation unit 134 and the position detector 131 which are arranged in the pump/flowmeter 138, then the gas pump control unit differentially compares the received detection signal with the set value for gas supply by the predetermined logical operation (program) and then accordingly transmits the respective control signal. The solenoid valve 137 is controlled upon the receipt of the control signal so that the gas supplying amount is controlled. At this time, the gas pump control unit 110 communicates with the control unit 210 of the transaction settlement terminal 200 with use of the communication cable (RS-485) such that the gas whose amount is determined by the setting unit 255, is supplied in the same manner as above, and herein the setting means of the gas pump 100 is enabled.

Figure 5:
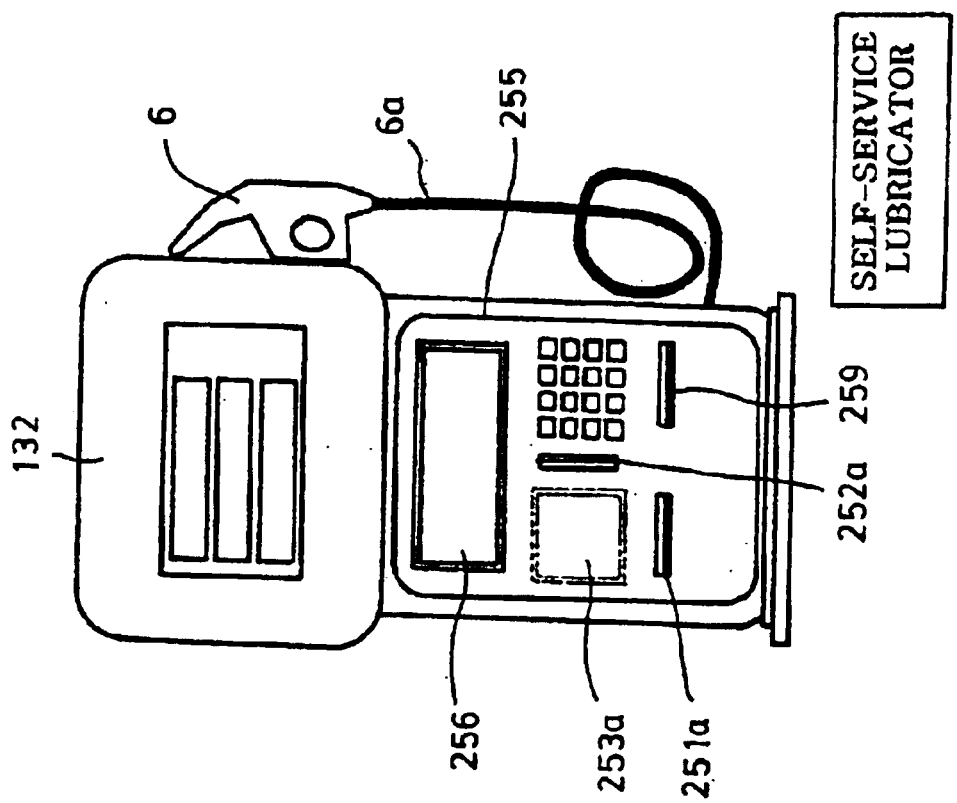
FIG. 5 illustrates one embodiment of the self-service gas pump shown in FIG. 4.
Figure 5:
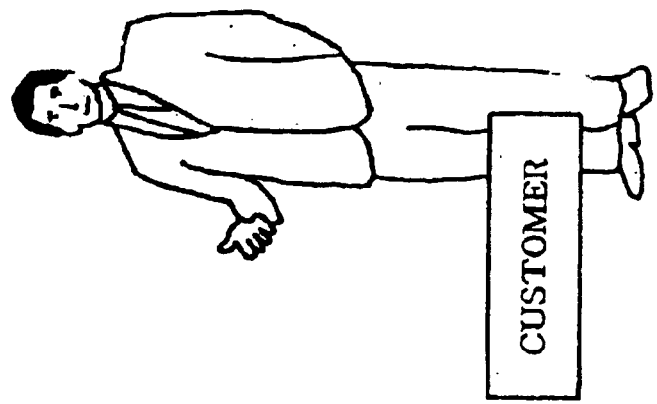

FIG. 5 illustrates one embodiment of the self-service gas pump shown in FIG. 4. The self-service gas pump in FIG. 5 has only one pumping slot. Referring to the figure, the self-service gas pump comprises a LCD indicator 256 for indicating the information required to do any key manipulation in graphics and characters, a setting unit 255 including a credit card setting key, an RF/IC card setting key, a cash setting key, a plurality of functional selection keys for setting gas supplying types such as a fixed payment amount type and a fixed gas amount type, a plurality of numerical keys, a correction key, and a reject key for selecting the appropriate menu, a receipt issuing unit 259 for issuing the receipt for the transaction amount with the use of either cash or various cards such as a credit card, a debit card, and a prepaid card, a card fluoroscopy window 253a for reading the radio-frequency card, a cash inserting slot 251a for inserting/extracting the cash, and a card inserting slot 252a for inserting/extracting the magnetic card and the IC card. Those elements described above are arranged in the front side. The self-service gas pump can further comprise a nozzle 14a and a nozzle gun 14 for pumping up the gas from the gas tank under the ground, and a display 132 for indicating the calculated payment amount and its unit price.

Figure 6:
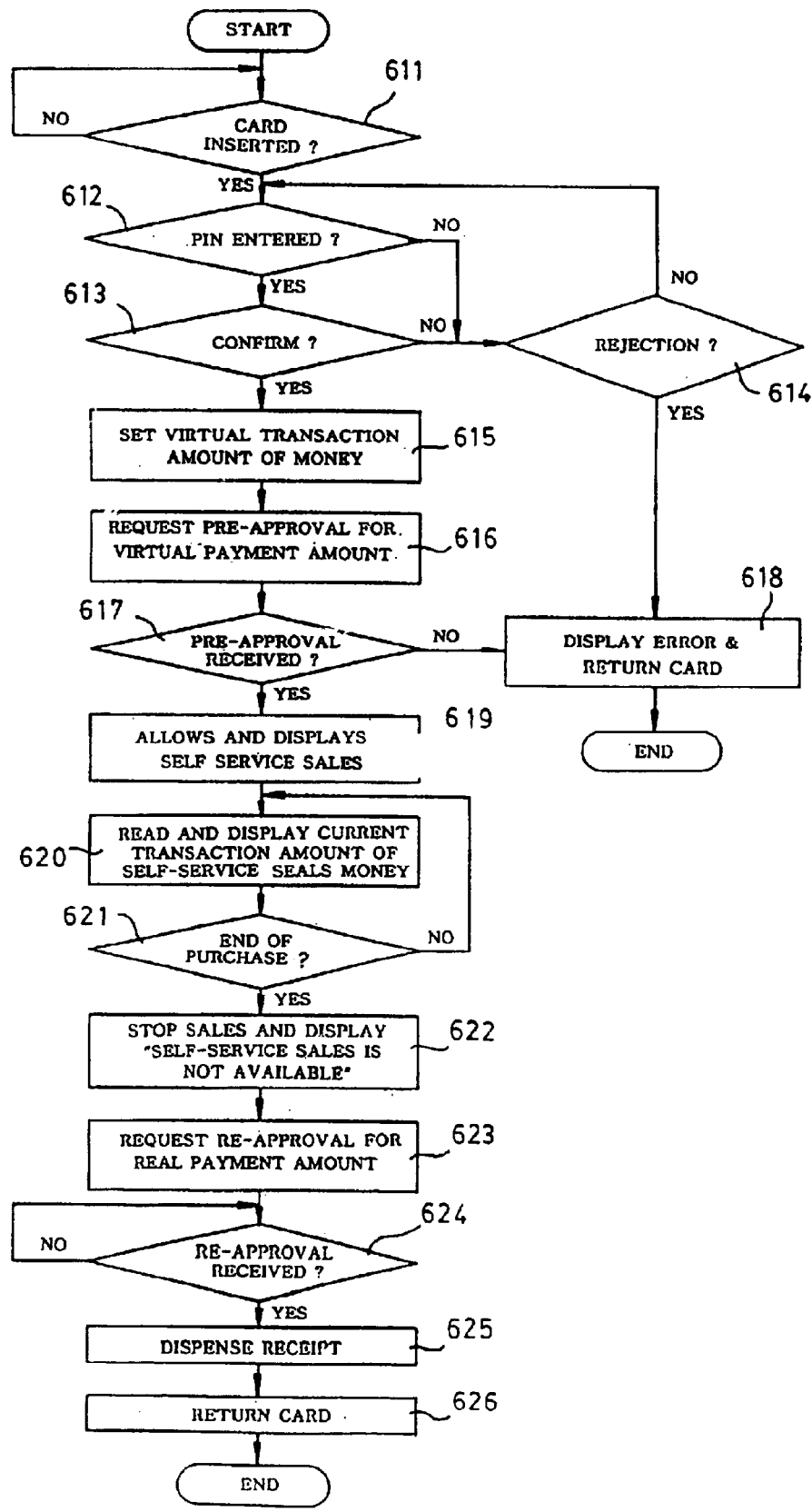
FIG. 6 is a flowchart for explaining the card transaction settlement method performed in the self-service gas pump shown in FIG. 4.

FIG. 6 is a flowchart for explaining the card transaction settlement method performed by the self-service gas pump shown in FIGS. 4 and 5. Referring to the figure, the card transaction settlement method of one embodiment of the present invention comprises steps 611–616 of requesting an approval before the card transaction ABCT for a virtual transaction amount VTA, steps 617, 618 of getting an authorization of the ABCT for the VTA, steps 619–622 of controlling transactions, a step 623 of requesting an approval after the card transaction AACT for an actual transaction amount ATA, a step 624 of getting an authorization of the AACT for the ATA and steps 625, 626 of resetting to an initial status of the self-service gas pump. The step of requesting the ABCT for the VTA is executed under a condition that personal identification numbers of the card are entered after the card is inserted and the virtual transaction amount is set.

Subsequent to the steps 611–616 of requesting the ABCT for the VTA, the steps 617, 618 of getting the authorization of the ABCT for the VTA are executed by checking a card validity after inquiring a card information data. If the ABCT for the VTA is not authorized, the card is directly returned after indicating a respective error message. On the contrary, if the ABCT for the VTA is authorized, next steps 619–622 of controlling transactions are executed. The steps 619–622 includes a permission of transactions, an indication of the permission status and a determination of completing transactions by checking and indicating the actual transaction amount which is changing as the gas is supplied. Another step 623 of requesting the AACT for ATA is continued to execute, which includes a prohibition of subsequent supply of the gas and an indication of the prohibition status. Subsequently, the step 624 of getting the authorization of the AACT for the ATA is executed. Finally, the steps 625, 626 of resetting to an initial stage of the self-service gas pump are executed. The steps 625, 626 include issuing a receipt for the actual transaction amount and returning the card.

Though not shown in the figure, the step of requesting the ABCT for the VTA can be executed in a condition that the personal identification numbers are not entered for the sake of the convenience by avoiding cumbersome key manipulation after the card is inserted.

The described card transaction settlement method in the self-service gas pump further comprises a step of canceling the ABCT for the VTA. The step of canceling the ABCT for the VTA can be executed immediately after the step 617, 618 of getting the authorization of the ABCT for the VTA, or be executed after the step 619–622 of controlling transactions, or else, be executed after the step 624 of getting the authorization of the AACT for the ATA. As described above, the operation process of the method can be adjusted so as to increase the efficiency of the system.

Figure 7:
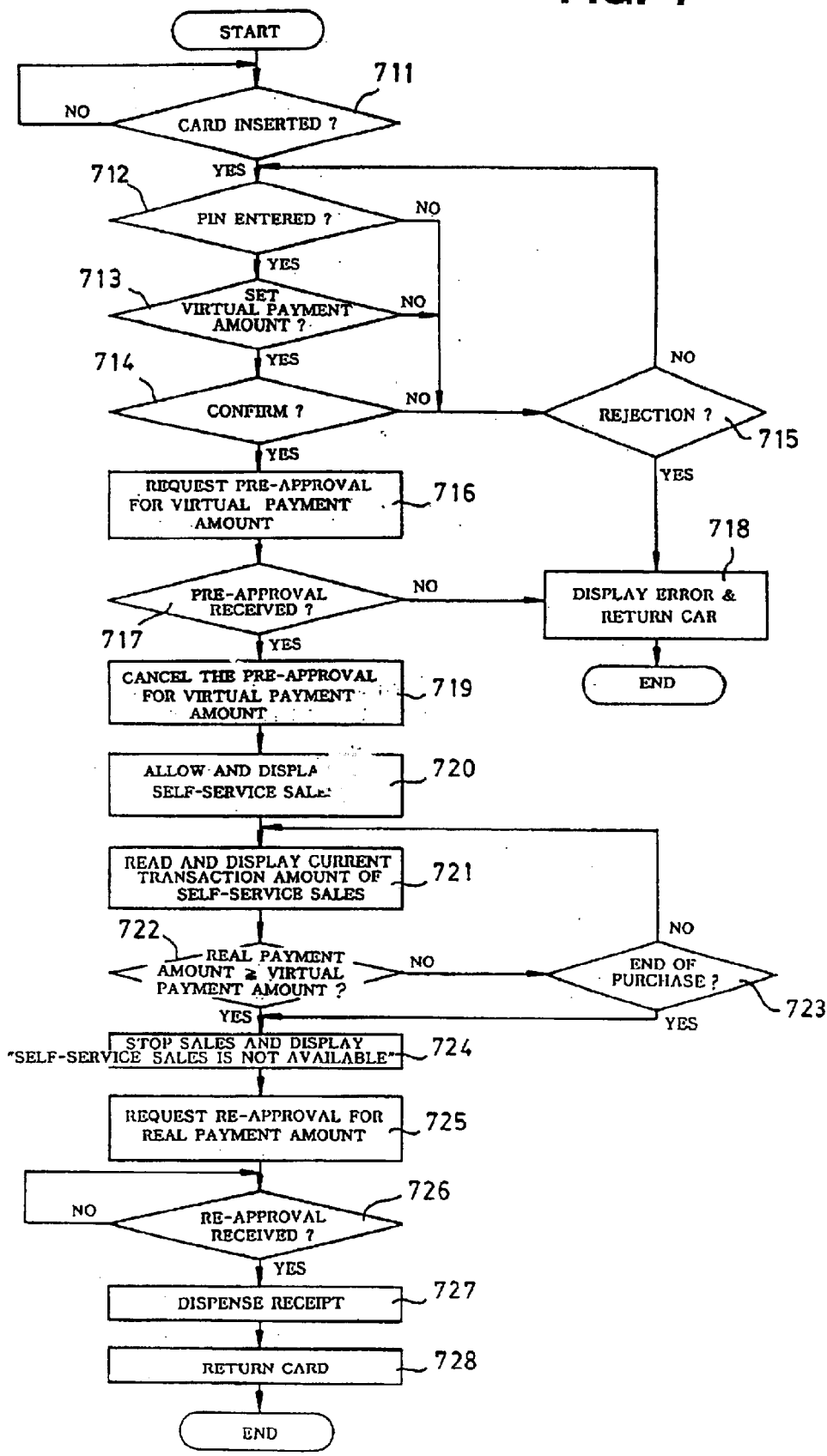
FIG. 7 is a flowchart for explaining the card transaction settlement method in the POS systems according to another embodiment of the present invention.

FIG. 7 is a flowchart for explaining a second embodiment of the card transaction settlement method of the present invention. Referring to the figure, the second embodiment of the card transaction settlement method comprises steps 711–716 of requesting an approval before the card transaction ABCT for the virtual transaction amount VTA, steps 717, 718 of getting an authorization of the ABCT for a VTA, steps 719 of canceling the ABCT for then VTA, a step 720, 721 of controlling transactions, a step 722–724 of evaluating an actual transaction amount ATA compared with the VTA, a step 725 of requesting an approval after the card transaction AACT for the ATA, a step 726 of getting an authorization of the AACT for the ATA and a step 727, 728 of resetting to an initial status of the POS system.

The steps 711–706 of requesting the ABCT for the VTA are executed under a condition that personal identification numbers of the card are entered after the card is inserted and the virtual transaction amount is set as a customer desires.

Subsequent to the step 711–716 of requesting the ABCT for the VTA, the steps 717, 718 of getting the authorization of the ABCT for the VTA are executed by checking the card validity after inquiring the card information data. If the ABCT for the VTA is not authorized, the card is directly returned after indicating a respective error message. On the contrary, if the ABCT for the VTA is authorized, the step 719 of canceling the ABCT for the VTA is executed immediately. And then the steps 720, 721 of controlling transactions are executed. The steps 720, 721 include a permission of transactions, an indication of the permission status and a determination of completing transactions by checking and indicating the ATA which is changing as the goods are supplied. Then the steps 722–724 of evaluating the ATA compared with the VTA are executed. The step 722–724 includes a prohibition of subsequent transactions when the ATA is the same as or exceeds to the VTA and an indication of the prohibition status. The step 725 of requesting the AACT for the ATA and the step 726 of getting the authorization of the AACT for the ATA are executed. Finally, the steps 727, 728 of resetting to an initial status of the POS system are executed. The steps 727, 728 include issuing a receipt for the ATA and returning the card. Herein the ABCT for the VTA can also be requested without the receival of the personal identification number in order to avoid inconvenience of manipulating the keys. Furthermore, the step 719 of canceling the ABCT for the VTA can be executed after the steps 720, 721 of controlling transactions or be executed after the step 726 of getting the authorization of the AACT for the ATA.

As described above, there are many variations in the process of each step in the card transaction settlement method.

Herein, the ABCT for the VTA can also be requested without the receival of the personal identification number in order to avoid inconvenience of manipulating the keys. The authorization of the ABCT for the VTA obtained in the step 711–716 of requesting the ABCT for the VTA can be automatically requested so to be canceled out just before requesting the AACT for the ATA while preventing the sales transaction from processing with displaying that status when transactions are completed in the step of controlling to make transactions. Furthermore, the acquired ABCT for the VTA can also be requested so to be canceled out when the authorization of the AACT is given in the step 725 of requesting the AACT for the ATA. As described above, there is flexibility in the process of each step in the card transaction settlement method.

Figure 8A:
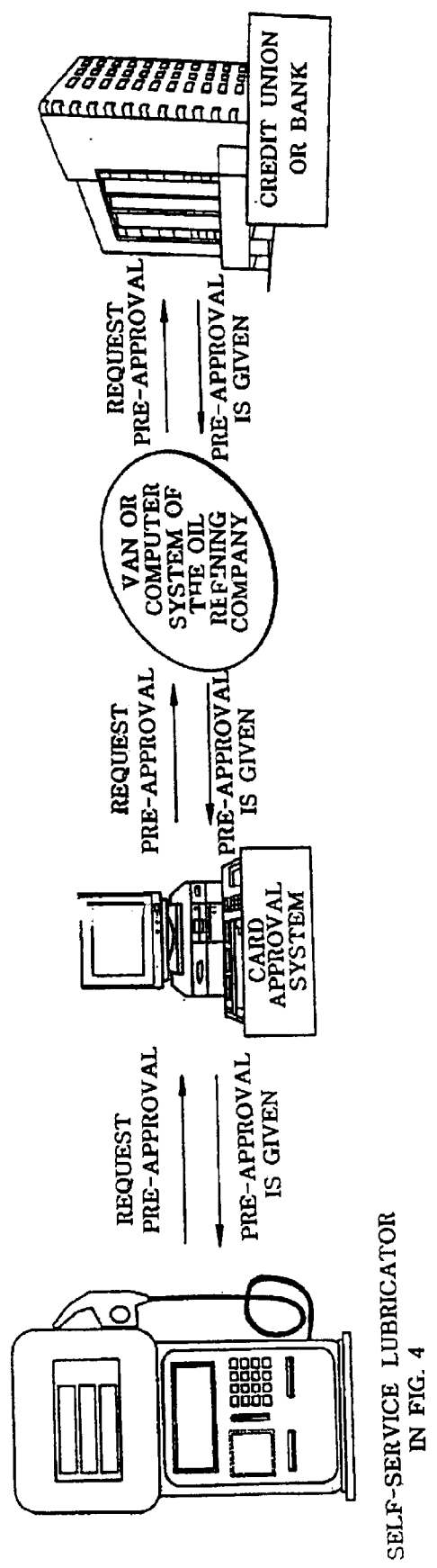
Figure 8C:
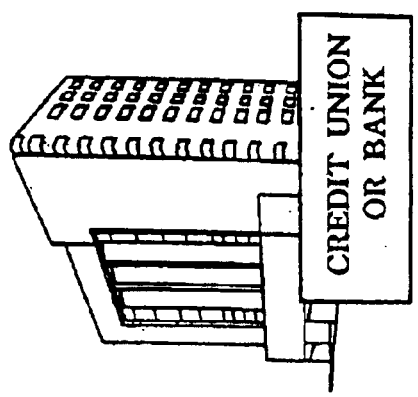
Figure 8C:
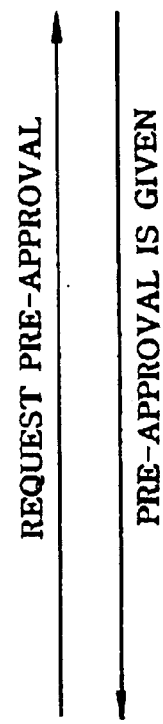
Figure 8C:
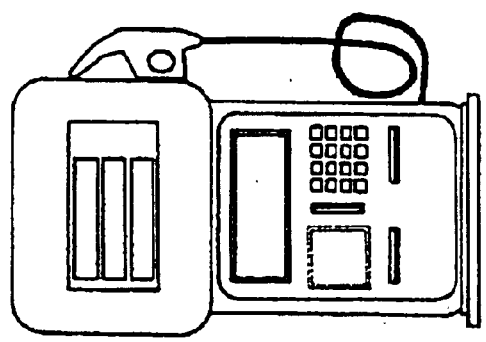
Figure 9A:
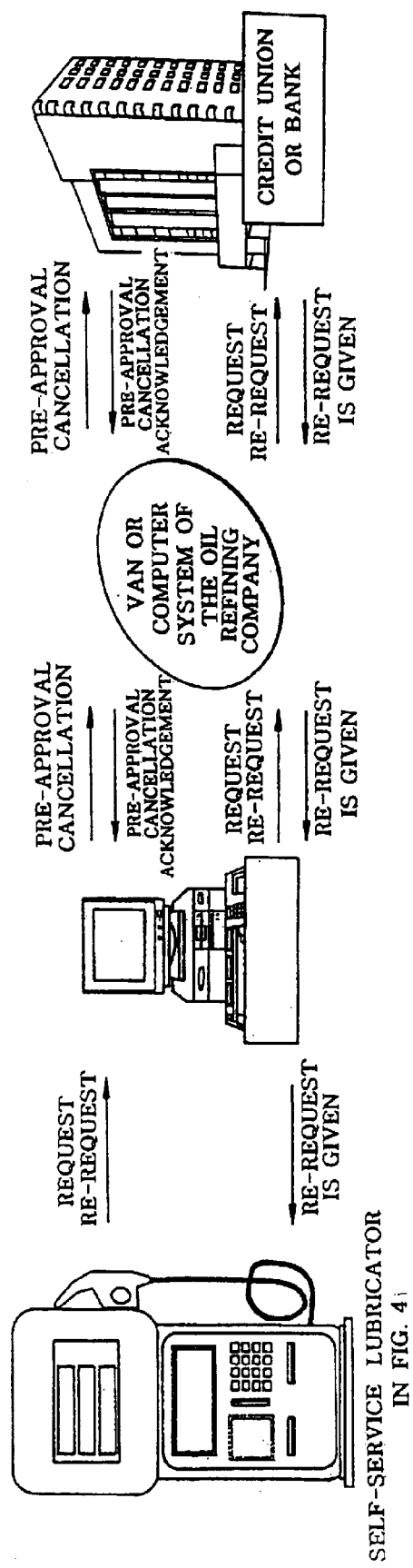
FIGS. 9a–9c illustrate routes for requesting and receiving an approval after a card transaction for an actual card transaction amount according to the present invention.
Figure 9B:
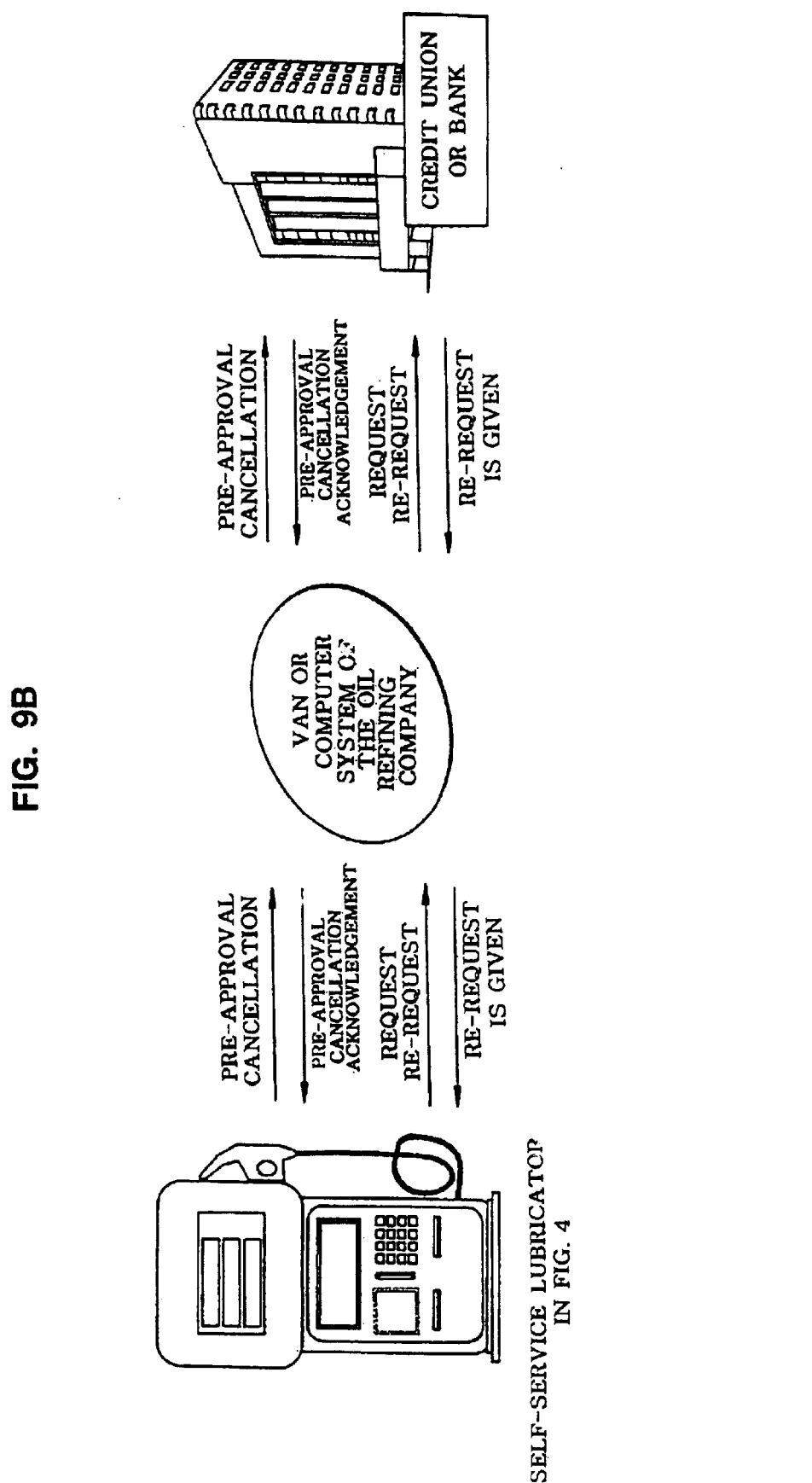
Figure 9C:
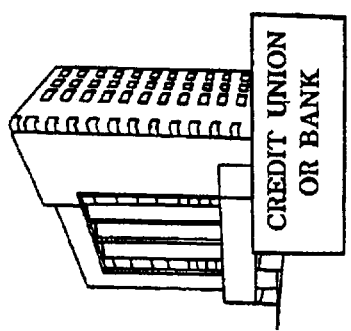
Figure 9C:
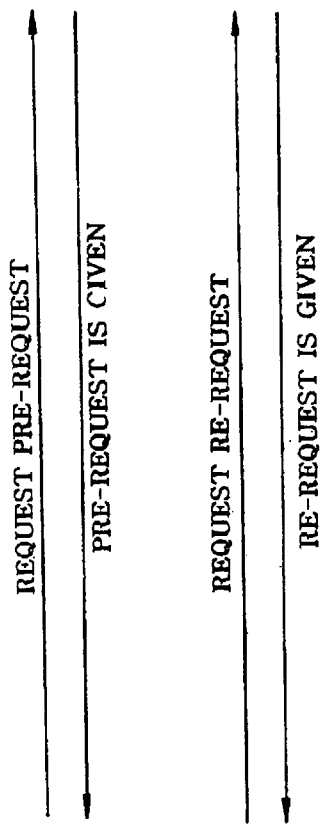
Figure 9C:
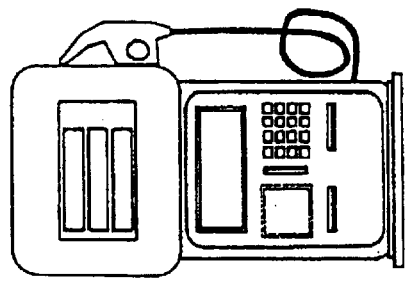

FIGS. 8a–8c illustrate routes for requesting and authorizating the ABCT for the VTA between the self-service gas pump and the card issuers according to the present invention, and FIGS. 9a–9c illustrate routes for requesting and authorizating the AACT for the ATA between the self-service gas pump and the card issuers according to the present invention.

FIG. 8a and FIG. 9a show the route in the case when the card authorization center and the card purchase company (such as value-added network enterprise, or the computer system of the oil refining company) are intermediate stations of the route, FIG. 8b and FIG. 9b show the route in the case when the card purchase company (such as value-added network enterprise, or the computer system of the oil refining company) is intermediate station of the route, and FIG. 8c and FIG. 9c show the route when the self-service gas pump directly communicates with the credit card issuing institution (or bank).

Referring to those figures, the card transaction settlement method in the self-service gas pump is as follows. First of all, the consumer makes the card read in the card recognizing unit 252–254 arranged on the gas pump. Upon the determination whether the personal identification number and the virtual transaction amount are inputted in the event that the card is inserted or immediately after the card is inserted, the self-service gas pump requests the ABCT for the VTA to the card issuing institution or the bank through the routes via the card authorization center and other communication network as in FIG. 8a or through the route via a card purchase company as in FIG. 8b or else by directly communicating as in FIG. 8c. If the card approval is authorized by either the card issuing institution or the bank, the gas pump is controlled to supply the gas, and the information that the gas pump can supply the gas is displayed to inform the consumer. Therefore, the gas can be supplied to the consumer after entry of either the personal identification number or the gas amount/payment amount. However, the gas can also be supplied to the consumer with the operation of reading the card, even without the key inputting.

Therefore, the consumer recognizes that the gas supply is possible with the use of the display so that the consumer starts to feed the vehicle with the gas using the gas pump. Then the system reads the amount changing with supplied gas amounts. Upon the detection of either the fact that gas supply is completed or the fact that the supplied gas amount is exceeded the virtual gas amount set previously, the self-service gas pump enters into the standby state for awaiting for an authorization of the AACT for the ATA after requesting the AACT for the ATA to the card issuing institution or the bank. The ABCT for the VTA can be canceled out immediately when the requested AACT for the ATA is authorized. Otherwise, for requesting the AACT for the ATA, the already obtained ABCT for the VTA can be automatically canceled out first of all, and then the AACT for the ATA can be requested, or vice versa. Upon the receival of the AACT for the ATA in the standby state, the receipt for the actual transaction amount can be issued with the use of the receipt issuing means and the card is returned.

It is apparent that the card transaction settlement method in the self-service POS system according to the present invention can be applied not only to the gas station but also to the tollgate system in the highway, the express bus ticket sales system, as well as other POS system which is capable of settling the card transaction with a small modification. It will be apparent that various changes may be made in the form and steps thereof without departing from the spirit and scope of the invention or sacrificing all of its advantages.

With the present invention, there are many advantages that a customer can purchase goods simply and quickly in self-service POS system with the ABCT for the VTA using credit card or debit card, that merchants need not ask a signature of a customer by automatically controlling any refunding problem caused from difference between the virtual transaction amount and the real transaction amount because he or she can obtain the AACT for the ATA even if the customer cannot estimate the actual transaction amount, that there is no change problem since the system operates with high precision, and that financial risk by any fraudulent card can be prevented since the ABCT for the VTA is requested before the transaction is taken place. The present invention can be applied to various fields such as Video on Demand VOD on Internet, cellular phone rental service, taxi charge as well as gas station.

What is claimed is:

1. A method for performing an electronic card enabled transaction in a point of sale (POS) system having a self-service facility electronically connected to a card authorization center via a public network, the self-service facility including a card transaction terminal, the method comprising the acts of:

(a) requesting an approval-before-the-transaction (ABCT) of the authorization center for setting a virtual transaction amount (VTA) at the self service facility;

(b) determining whether the transaction is valid or not by validating the card and a corresponding account at the authorization center;

(c) approving the VTA if a determination has been made that the card and account are valid and responsively sending an approval signal to the self-service facility;

(d) executing the transaction at the self-service facility on the basis of the approval signal if the VTA is approved;

(e) requesting an approval-after-the-card-transaction (AACT) of the authorization center for setting an actual transaction amount (ATA) on the basis of the actual executed transaction;

(f) revalidating the VTA into the ATA at the authorization center and sending a confirmation signal to the self-service facility; and (g) initializing the self-service facility for a next transaction and issuing a receipt for the actual executed transaction.

2. The method of claim 1 wherein the VTA is a maximum anticipated transaction amount which is set for a particular one-time transaction.

3. The method of claim 2 wherein the maximum anticipated transaction amount is determined by attributes of an item or service to be provided in the transaction.

4. The method of claim 3 wherein the item or service is one for which a payment amount is not determined before the actual transaction is executed.

5. The method of claim 3 wherein the attributes comprise at least one of: a physical amount of the item; availability of the item or service; and a service time.

6. The method of claim 1 further comprising, before said act (a), the acts of:

reading the card in the card transaction terminal of the self-service facility; and identifying a user using a entered personal identification number.

7. The method of claim 1 further comprising the acts of:

denying the VTA if a determination is made that one of the card and account are invalid; and responsively sending an approval failure signal to the self-service facility.

8. The method of claim 1 further comprising canceling the ABCT for the VTA after one of act (a), (b), and (c).

9. The method of claim 1 wherein the ATA is prevented from exceeding the VTA.

10. A method for performing an electronic card enabled transaction in a point of sale (POS) system having a self-service facility electronically connected to a card authorization center via a public network, the self-service facility including a card transaction terminal, the method comprising the acts of:

(a) requesting an approval-before-the-transaction (ABCT) of the authorization center for setting a virtual transaction amount (VTA) at the self-service facility;

(b) validating the card and a corresponding account at the authorization center;

(c) approving the VTA if a determination is made that the card and account are valid and responsively sending an approval signal to the self-service facility, the approved VTA being the lesser of: (1) a target VTA related to anticipated parameters of the transaction; and (2) a value related to an available amount in said account;

(d) executing the transaction at the self-service facility on the basis of the approval signal if the VTA is approved and including restricting such execution to prevent an actual transaction amount (ATA) from exceeding the approved VTA;

(e) requesting an approval-after-the-card-transaction (AACT) of the authorization center for charging or debiting the account in the amount of the ATA on the basis of the actual executed transaction; and (f) initializing the self-service facility for a next transaction and issuing a receipt for the actual executed transaction.

* * * * *

UNITED STATES PATENT AND TRADEMARK OFFICE
CERTIFICATE OF CORRECTION

PATENT NO. : 6,824,049 B2
DATED : November 30, 2004
INVENTOR(S) : Jong In Lee and Kang Hyoung Kim It is certified that error appears in the above-identified patent and that said Letters Patent is hereby corrected as shown below:

<u>Title page,</u>
Insert Item -- [30] Foreign Application Priority Data
KR 98-14406 April 22, 1998 --.

Signed and Sealed this

Sixth Day of September, 2005

JON W. DUDAS
*Director of the United States Patent and Trademark Office*